US008748806B2

(12) United States Patent
Sqalli et al.

(10) Patent No.: US 8,748,806 B2
(45) Date of Patent: Jun. 10, 2014

(54) APPARATUS AND METHOD FOR REDUCING VISIBILITY OF SPECKLE IN COHERENT LIGHT BY HOMOGENIZATION OF COHERENT ILLUMINATION THROUGH A WAVEGUIDE WITH A VIBRATABLE MEMBRANE MIRROR

(75) Inventors: Omar Sqalli, Bad Aussee (AT); Nicolas Descharmes, Dublin (IE)

(73) Assignee: Optyka Limited, Dublin (IE)

( * ) Notice: Subject to any disclaimer, the term of this patent is extended or adjusted under 35 U.S.C. 154(b) by 319 days.

(21) Appl. No.: 13/146,186

(22) PCT Filed: Jan. 27, 2010

(86) PCT No.: PCT/EP2010/050947
§ 371 (c)(1),
(2), (4) Date: Oct. 20, 2011

(87) PCT Pub. No.: WO2010/086336
PCT Pub. Date: Aug. 5, 2010

(65) Prior Publication Data
US 2012/0044464 A1 Feb. 23, 2012

(30) Foreign Application Priority Data

Jan. 27, 2009 (GB) .................................. 0901305.3

(51) Int. Cl.
*G01J 4/00* (2006.01)
(52) U.S. Cl.
USPC .................................. 250/227.19; 250/227.18
(58) Field of Classification Search
USPC .................. 250/227.11, 227.18, 227.19, 235;
359/237, 238, 242, 278; 385/8, 11, 28;
372/50.121, 28, 22, 21, 26, 98, 9
See application file for complete search history.

(56) References Cited

U.S. PATENT DOCUMENTS

| 3,588,217 | A | * | 6/1971 | Mathisen ........................ 359/32 |
| 4,155,630 | A | | 5/1979 | Ih |
| 2006/0126184 | A1 | | 6/2006 | Kim et al. |
| 2008/0192327 | A1 | | 8/2008 | Abu-Ageel |
| 2008/0198334 | A1 | | 8/2008 | Kasazumi et al. |
| 2010/0118535 | A1 | | 5/2010 | Kusukame et al. |

FOREIGN PATENT DOCUMENTS

| EP | 1677144 A1 | 7/2006 |
| GB | 2462444 A | 2/2010 |
| WO | 0062114 | 10/2000 |
| WO | 2007/072335 A2 | 6/2007 |

(Continued)

OTHER PUBLICATIONS

Office Action dated Jul. 3, 2013 for Application No. GB0901305.3 (3 pages).

(Continued)

*Primary Examiner* — Que T Le
(74) *Attorney, Agent, or Firm* — Shumaker & Sieffert, P.A.

(57) ABSTRACT

An apparatus and method for reducing the visibility of speckle in coherent light comprises propagating the coherent light through a multimode optical waveguide 106 to reduce a coherence length of the coherent light by intermodal dispersion. A vibratable membrane mirror 104 is arranged to reflect the coherent light either before or after passing through the multimode optical fiber further to reduce the coherence length by distributing wave packets across different propagating modes and to erase the modal structure by averaging the distribution of energy across the modes leading to a more uniform illumination. The invention may be used for speckle removal in a laser scanning projector.

17 Claims, 8 Drawing Sheets

(56) References Cited

FOREIGN PATENT DOCUMENTS

| WO | 2007072335 A2 | 6/2007 |
| WO | 2008083336 A2 | 7/2008 |
| WO | 2009104392 A1 | 8/2009 |

OTHER PUBLICATIONS

International Search Report for International Application PCT/EP2010/050947 dated Mar. 22, 2010 (3 pgs.).

Office Action dated Mar. 14, 2013 for Application No. GB0901305.3 (3 pages).

* cited by examiner

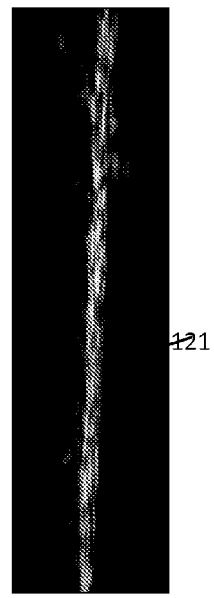
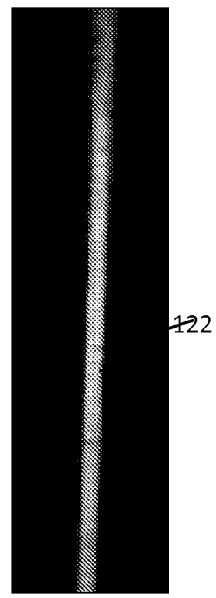
Figure 14a                Figure 14b
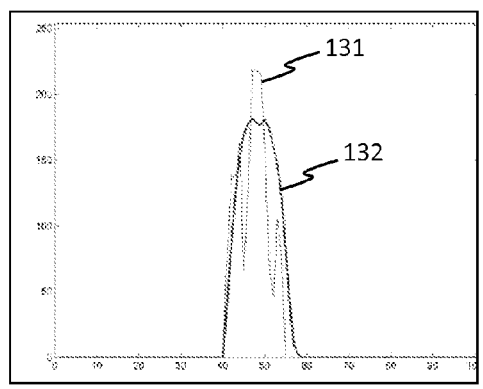
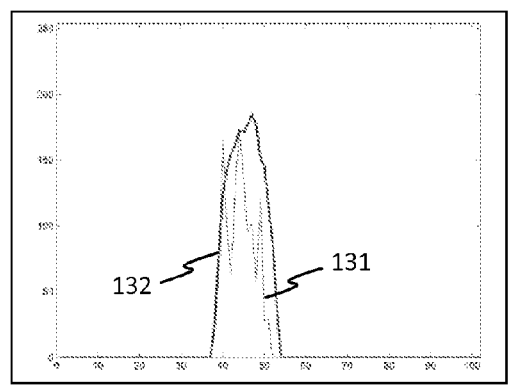
Figure 15a                Figure 15b

APPARATUS AND METHOD FOR REDUCING VISIBILITY OF SPECKLE IN COHERENT LIGHT BY HOMOGENIZATION OF COHERENT ILLUMINATION THROUGH A WAVEGUIDE WITH A VIBRATABLE MEMBRANE MIRROR

CROSS REFERENCE TO RELATED APPLICATION

This is a National Stage filing under 35 U.S.C. 371 of International Application No. PCT/EP2010/050947, filed Jan. 27, 2010, which claims priority to GB Application No. 0901305.3, filed Jan. 27, 2009.

This invention relates to an apparatus and method for reducing the visibility of speckle and in particular to a laser scanning projector with speckle removal.

BACKGROUND

The guiding of optical radiation by waveguides such as planar waveguides or optical fibres is well known. While planar waveguides have a wide range of structures and geometries, as illustrated in FIGS. 2a to 2f, optical fibres, as shown in FIG. 3, usually have a circular transverse cross-section. FIGS. 2a to 2f show a sample of classical "simple" planar waveguide geometries; more complex variations of these are widely used to perform integrated optical functions such as coupling and switching. Optical waveguides rely on total internal reflection at an interface between two media of different refractive index to confine light within their cores. A wide range of materials from silica to polymers have been used to manufacture optical waveguides providing a range of properties.

Referring to the cross-section of a planar optical waveguide in FIG. 1, the general structure of a planar optical waveguide 10 comprises a core 11 of refractive index $n_c$ on a substrate 12 of refractive index $n_s$, the core being enclosed by one or more layers of cladding 13, 14 of a lower refractive index $n_R$, $n_L$ than that of the core, i.e. $n_s$, $n_R$, $n_L < n_c$. Under appropriate circumstances, mainly due to the difference in refractive indices, light injected into the core 11 at a first end of the optical waveguide 10 is confined to propagate along the core and is emitted at a second end of the optical waveguide 10, opposed to the first end.

Depending on the geometry and material composition of an optical waveguide, the emitted light will have different properties from the light that was injected into the optical waveguide. Intensity, spectral distribution and the polarization state of a wave are generally voluntarily or involuntarily modified by propagation through the waveguide.

Optical fibres are the most commonly used optical waveguides. Because of their low attenuation and compactness, and because they are not affected by electromagnetic field variations in a surrounding environment, optical fibres are used to transport light signals over very long distances without repeating electronics, to transport large numbers of signals simultaneously over short and medium distances without interference and to make sensors of many kinds, such as strain and temperature sensors.

Referring to FIG. 3, an optical fibre 30 is generally formed of a single core 31 of circular transverse cross-section, covered by a concentric cladding 33 with a refractive index slightly lower than a refractive index of the core 31. A typical near infrared multimode fibre has a 50 μm diameter core of Ge-doped silica with a refractive index $n_1$ and a 125 μm diameter cladding of undoped silica, refractive index $n_2$=1.46. A typical refractive index difference ($n_1$-$n_2$) is in the range 0.001 to 0.01. The cladding 33 may be covered by a protective layer 35.

In a monomode optical fibre light propagates in a single mode. In a multimode optical fibre, light propagates at a given wavelength in a finite, discrete number of optical modes. It is generally difficult to provide a mathematical expression for every propagating mode when a fibre is multimode. Nevertheless, it is possible to provide an approximate number of the modes. It is also possible to predict some characteristics such as a speed of propagation of a pulse, its attenuation and the broadening the pulse suffers through propagation.

A very useful parameter to describe an optical fibre is its Numerical Aperture (NA) which defines an acceptance angle θ of the fibre according to:

$$NA = n_1 \sin \theta$$

Extending the analysis, the following expression for the Numerical Aperture is obtained:

$$NA = \sqrt{n_1^2 - n_2^2}$$

Thus this parameter depends on only the core and cladding refractive indexes. Any light entering at an angle of incidence greater than the acceptance angle θ will be dissipated in the cladding and protective layer.

Knowing the numerical aperture, one can calculate a normalized frequency V for the propagation, where a is the core radius and $k_0$ a propagation vector:

$$V = a k_0 NA$$

For a step index fibre, a single mode ($LP_{01}$) is guided when $1 < V < 2.405$ For $V \gg 1$ the number N of modes propagating through the fibre at the given wavelength is given approximately by $$N \approx \frac{V^2}{2}$$

It can be shown that each guided mode traveling through a multimode fibre has a slightly different speed. This phenomenon is known as intermodal dispersion and normally causes a serious limitation to the bandwidth of an optical fibre. An optical pulse injected into the fibre is broadened with distance by the intermodal dispersion. If not taken into account, this phenomenon prevents resolution of successive pulses.

A propagation constant $\beta_m$ for a guided mode m, at wavelength $\lambda_0$ can be shown to meet the condition:

$$k_0^2 n_2^2 < \beta_m^2 < k_0^2 n_1^2$$

Disregarding both guide and material dispersion, which are usually much smaller than intermodal dispersion, one can show that the intermodal dispersion D can be written as:

$$D \cong \frac{NA^2}{2 n_1 c}$$

As a consequence, a maximum delay between the "fastest" and the "slowest" mode over a distance L can be expressed as:

$$\Delta \tau \cong \frac{NA^2}{2 n_1 c} L$$

A coherence time is generally defined as an average duration of a wave train, i.e. a time for the wave train to travel a coherence length L. One manifestation of the coherence time is a fringe contrast variation obtained when lengthening a reference arm in a Michelson-like interferometric setup, as shown in FIG. 4.

WO 2007/072335 discloses a multimode waveguide in combination with an oscillating mirror for reducing the visibility of speckle to the human eye, the period of the mirror being below the integration time of the eye. A light modulation panel receives light transmitted from the mirror through the multimode optical fibre and modulates an intensity per pixel of the image. A projection lens projects an image from the light modulation panel onto a screen, with angular scanning by the oscillating mirror retained thereon. In a second embodiment disclosed in WO 2007/072335, the multimode optical fibre is located between the laser source and the oscillating mirror instead of between the oscillating mirror and the light modulation panel.

BRIEF SUMMARY OF THE DISCLOSURE

In accordance with a first aspect of the present invention there is provided an apparatus for reducing visibility of speckle in coherent light comprising multimode optical waveguide means arranged to propagate the coherent light therethrough to reduce a coherence length of the coherent light by intermodal dispersion and vibratable membrane mirror means arranged to reflect the coherent light either before or after passing through the multimode optical fibre means further to reduce the coherence length by distributing wave packets across different propagating modes and to erase the modal structure by averaging the distribution of energy across the modes leading to a more uniform illumination.

Conveniently, the vibratable membrane mirror means is arranged to reflect parallel rays of the coherent light at a plurality of varying angles so that a distribution of power and phase over modes propagating in the optical waveguide means varies with time.

Conveniently, a laser is coupled by an optical fibre to collimating lens means arranged to cause the coherent light to be incident upon the vibratable membrane mirror means.

Advantageously, the apparatus is arranged such that light from the collimating lens means is incident of the vibratable membrane mirror means at substantially 45°.

Conveniently, the apparatus further comprises coupling optics means arranged to couple the coherent light from the vibratable membrane mirror means to the multimode optical waveguide means.

Advantageously, the apparatus comprises optics arranged to project light from the multimode optical waveguide means.

Conveniently, the vibratable membrane mirror means comprises piezoelectric actuator means arranged to drive the membrane.

Conveniently, the multimode optical waveguide means is a step index, multimode optical fibre.

Advantageously the apparatus comprises a laser line generating device.

According to a second aspect of the invention, there is provided a method of reducing visibility of speckle in coherent light comprising: propagating the coherent light through multimode optical waveguide means arranged to reduce a coherence length of the coherent light by intermodal dispersion; and reflecting the coherent light from a vibratable membrane mirror means either before or after passing through the multimode optical waveguide means further to reduce the coherence length by distributing wave packets across different propagating modes and to erase the modal structure by averaging the distribution of energy across the modes leading to a more uniform illumination.

Conveniently, the method comprises causing a collimated coherent light beam to be incident upon the vibratable membrane mirror means using collimating lens means coupled by an optical fibre to the laser.

Advantageously, light from the collimating lens is incident on the vibratable membrane mirror means at substantially 45°.

Conveniently, the method comprises coupling the collimated coherent light beam to the multimode optical waveguide means using coupling optics.

Conveniently, the method comprises projecting light from the multimode optical waveguide using projection optics means.

Conveniently, the method comprises driving the membrane of the vibratable membrane mirror means with piezoelectric actuator means.

Conveniently, the multimode optical waveguide means is a step index, multimode optical fibre.

BRIEF DESCRIPTION OF THE DRAWINGS

Embodiments of the invention are further described hereinafter with reference to the accompanying drawings, in which:

FIG. 14a is an image of a scanning line as recorded on the CMOS matrix of FIG. 12 without any anti-speckle measures;

FIG. 14*b* is an image of a scanning line as recorded on the CMOS matrix of FIG. 12 with anti-speckle provided by a deformable mirror vibrating at resonance; and FIGS. 15*a* and 15*b* are superimpositions of a cross-section across two positions respectively of the scanning line of FIGS. 14*a* and 14*b* showing intensity distribution across the projected line with and without speckle removal.

DETAILED DESCRIPTION

In accordance with the present invention the energy of a wave train is distributed over a plurality of modes of a multimode optical fibre in such a way that intermodal dispersion creates sufficient time delay between the set of modes significantly to reduce speckle contrast, where speckle contrast is defined as the ratio of the standard deviation of the intensity to the mean of the intensity across a coherently illuminated area.

It is usually accepted that, for light emission of spectral line width $\Delta v$, or $\Delta \lambda$ centered around $\bar{\lambda}$, the coherence time $t_c$ is approximately:

$$t_c \cong \frac{1}{\Delta v} = \frac{\lambda^2}{c \Delta \lambda}$$

The following table records typical linewidth values and associated coherence times for different laser technologies.

|  | Linewidth | Coherence time |
| --- | --- | --- |
| Mode locked gas laser | 3 MHz | 300 ns |
| Multi longitudinal mode gas laser | 0.5 GHz | 2 ns |
| DPSS laser | 0.1 nm (~0.1 THz @ 532 nm) | 10 ps |
| Diode laser | 1 nm (~1 THz @ 532 nm) | 1 ps |

FT400EMT is a commercial optical fibre available from InnovaQuartz the characteristics of which are as follows: Radius a=200 μm and Numerical aperture NA=0.39. The wavelength λ used in the example is 532 nm.

Using the previous result, $V=ak_0NA$, the normalized frequency for the propagation is V=920 corresponding to a number $$N = \frac{V^2}{2}$$

of approximately 425,000 modes.

These results lead to a value of D for the intermodal dispersion: $D \cong 173$ ps/m. In other words, if the light source is a laser diode with a 1 nm line width, according to the above table a few centimeters of this fibre should be sufficient to decrease the coherence of the emitted light and therefore the speckle contrast ratio.

Note that gradient index fibres have been explicitly developed to minimize intermodal dispersion, compared with step index fibres. As a consequence, gradient index fibres are not generally suitable for despeckling.

The influence of step index optical fibres on coherent light has been described. Nevertheless the use of a single fibre is generally not enough to remove speckle efficiently. One reason is that the fibre light always remains highly coherent within one mode of propagation. Therefore light spreading in slightly different directions or angles according to the mode it was coupled in, results in high contrast speckle which are generally observable locally when projecting the light on a screen. Another reason is that the velocities of propagating modes are not evenly distributed within the range $[n_1 \cdot c, n_2 \cdot c]$. This tends to minimize the impact of intermodal dispersion in an optical fibre on the coherence length.

In reality, efficient speckle removal requires vibration of a membrane mirror creating deflections up to 30 μm peak-to-valley or more (depending on many criteria such as diameter, elasticity and thickness of pellicle, location and bandwidth of an actuator assembly method).

Figure 7:
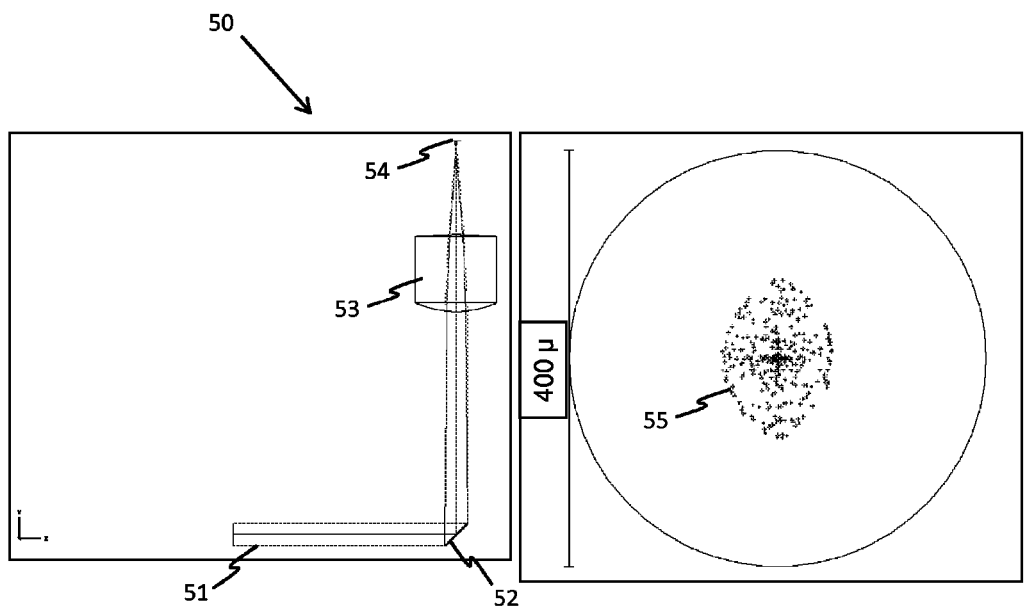
FIG. 7 is a simulation of a range of input rays resulting from reflection from a 1 μm peak to valley ripple with a 500 μm spatial period on a vibrating membrane mirror according to an embodiment of the invention.

FIG. 7 is a diagram of a simulation of a range of input rays resulting from reflection from a 1 μm peak to valley ripple with a 500 μm spatial period on a vibrating membrane mirror 52 according to an embodiment of the invention. A coherent light beam 51 is reflected by the vibrating membrane mirror 52 and the reflected light focussed by projection optics 53 onto an image detector 54, where a broadened spot 55 is detected.

Figure 8:
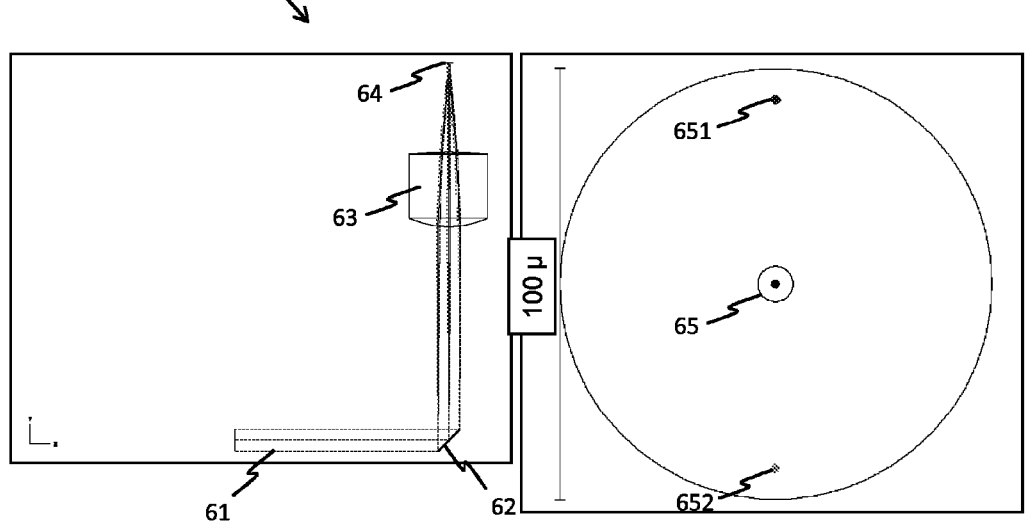
FIG. 8 is a simulation of a range of input rays resulting from reflection from a +/−0.2 degrees tip/tilt mirror located at 10 mm from coupling optics.

FIG. 8 is a diagram of a simulation of a range of input rays resulting from reflection from a +/−0.2 degrees tip/tilt mirror 62 located at 10 mm from coupling optics 63. A coherent light beam 61 is reflected by the tip/tilt mirror 62 and the reflected light focussed by projection optics 63 onto an image detector 64, where a broadened spot 65, 651, 652 is detected where spots 651 and 652 represent the maximum and minimum shift achievable from the single axis tip-tilt mirror while maintaining coupling efficiency consistent with the Numerical Aperture of the fibre.

Figure 9:
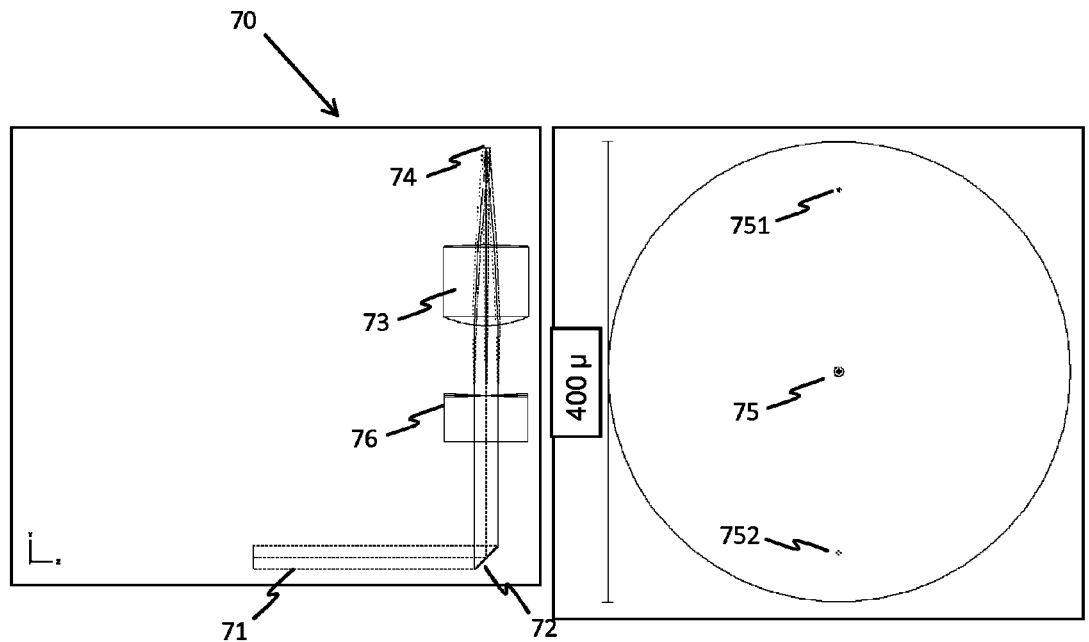
FIG. 9 is a simulation of a range of input rays resulting from reflection from a rotating BK7 prism, a few millimeters thick, located at 3 mm from coupling optics.

FIG. 9 is a diagram of a simulation of a range of input rays resulting from reflection from a rotating BK7 prism 76, a few mm thick (but independent of thickness) located at 3 mm from coupling optics 73 to provide a +/−150 μm spot displacement in the fibre entrance plane assuming a 3 degrees inclination of the tilted face and a +/−50 μm displacement assuming a 1 degree inclination of the tilted face. A coherent light beam 71 is reflected by a mirror 72 and reflected by the rotating prism 76 and the emergent light focussed by the projection optics 73 onto an image detector 74, where a broadened spot 75, 751, 752 is detected.

Figure 10:
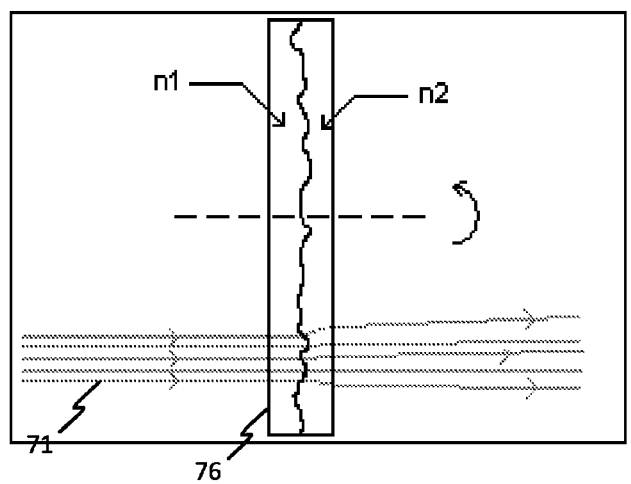
FIG. 10 is a schematic drawing of a rotating phase plate and its effect on a incident collimated laser beam.

FIG. 10 is a schematic drawing of a rotating phase plate 76 and its effect on a incident collimated laser beam 71.

It will be understood that any of the components of FIGS. 8 to 10 could in principle be used with a multimode optical fibre further to reduce speckle. However, moving elements of these devices move more slowly than the membrane of the membrane mirror of FIG. 7 and their beam deflection is repetitive. Accordingly, the temporal incoherence introduced is not as effective as by the deformable membrane mirror which operates at high frequency and deflects the beam in a more random manner. The impact of improving temporal incoherence is greater reduction of speckle. Again, using a high frequency drive on the deformable mirror, high frequency imaging with no speckle is possible. The alternative configurations of FIGS. 8 to 10 have limitations on frequency.

Figure 11:
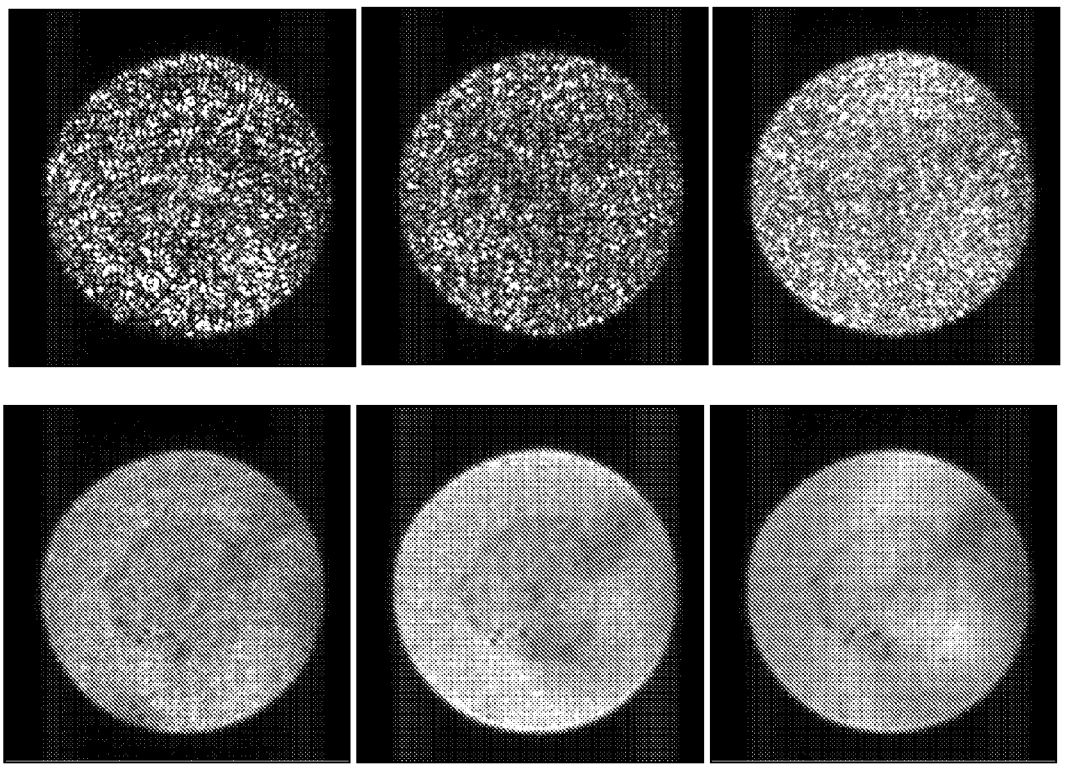
FIG. 11 shows the influence of fibre length on speckle when a deformable mirror is steady (upper row) and vibrating at resonance (lower row), in accordance with an embodiment of the invention.

FIG. 11 shows speckle patterns as recorded at the output of various patch lengths of a commercially available multimode fibre (FT400EMT). The first row illustrates the influence of the fibre length on speckle/fringe contrast as a membrane mirror 52 is kept steady without vibrating. The second row shows the additional improvement in speckle removal by excitation of the membrane mirror at its resonance frequency. The photographs of FIG. 11 were recorded with a 300 μs exposure time. Speckle reappears for exposure times of less than about 10 μs.

Although there is a significant difference in velocity between the fastest and the slowest mode in a large multimode fibre such as FT400EMT, most of the light, over 70%, in a very short time is in the TEM$_{00}$ mode. Therefore introducing a dynamic coupling mirror 52 resonating at high frequency serves two purposes: First the dynamic coupling mirror continuously distributes the wave packets across the different propagating modes, maximizing the effect of intermodal dispersion. Additionally, the resonating dynamic coupling mirror 52 erases the modal structure of the cone of light emitted from the optical fibre by averaging the distribution of energy across the modes, leading to a more uniform illumination.

Referring back to FIGS. 5a and 5b, a multimode fibre 50 introduces delay between the different propagating modes by intermodal dispersion. This effect is beneficial for speckle removal if delays of the order of the coherence time of the source can be introduced between the fastest modes and the slowest ones.

Unfortunately, assuming a steady, good quality coupling of the laser into the fibre, most of the energy propagates at speeds close to the fastest mode and only a tiny fraction of the input light will arrive with the maximum theoretical delay. As a consequence, the output light will be greatly coherent. This phenomenon can be modelled by introducing an "efficient" intermodal delay $\Delta\sigma_{eff}$ corresponding to an energy-weighted equivalent of the original intermodal delay $\Delta\sigma_{th}$.

Figure 1:
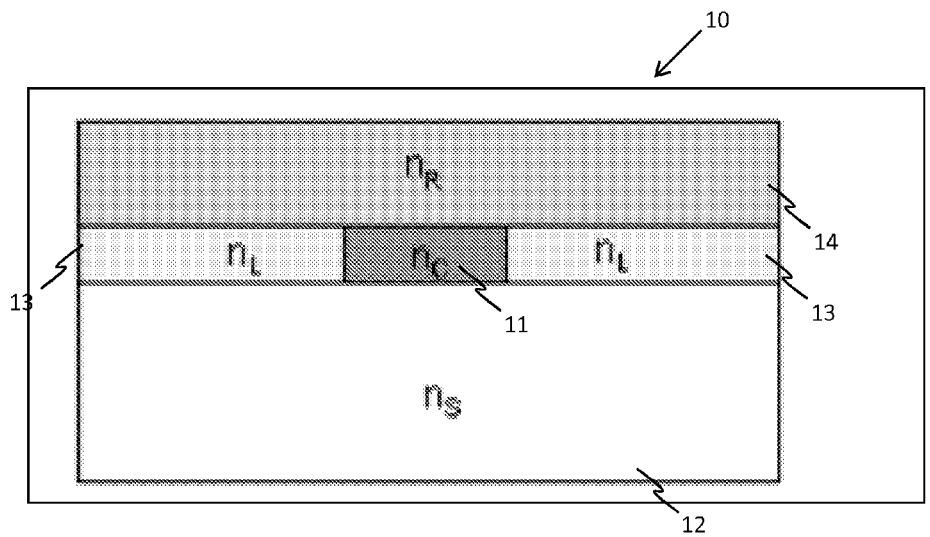
FIG. 1 is a transverse cross-section of a known planar optical waveguide.
Figure 2A:
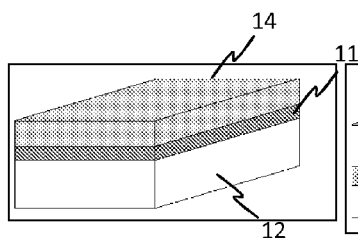
FIGS. 2a-2f are perspective views of known types of planar optical waveguides.
Figure 2B:
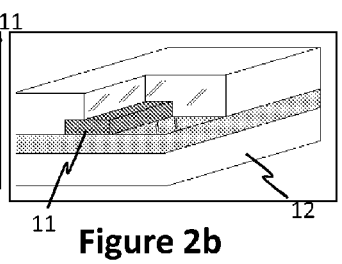
Figure 2C:
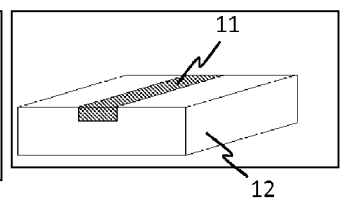
Figure 2D:
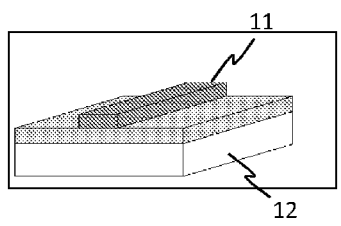
Figure 2E:
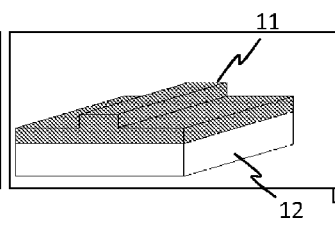
Figure 2F:
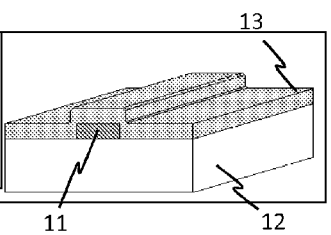
Figure 3:
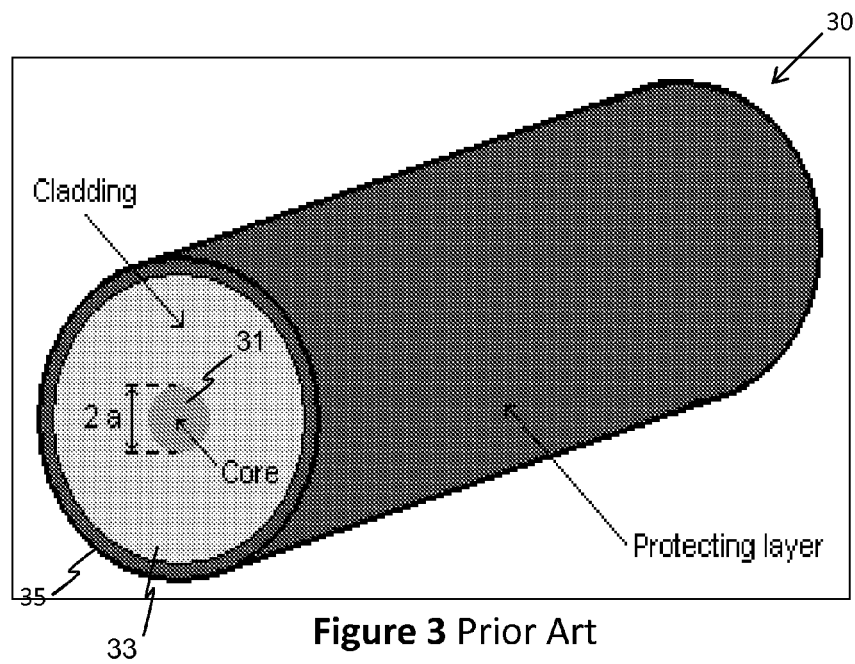
FIG. 3 is a perspective view of a known optical fibre.
Figure 4:
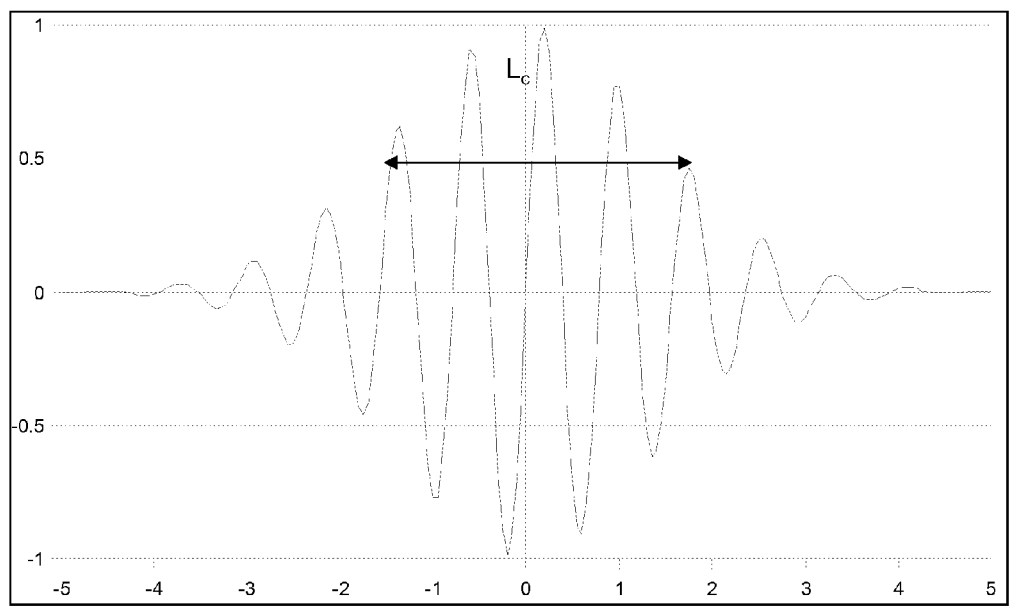
FIG. 4 is a superimposition of coherence length on a plot of the fringe contrast (Y axis) while translating a reference mirror (X axis) in a Michelson-like interferometric experiment.
Figures 5A, 5B:
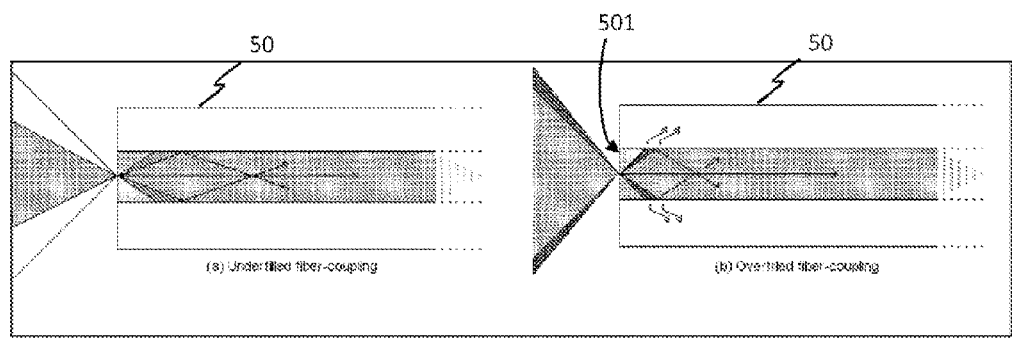
FIG. 5a is a schematic drawing of an underfilled fibre coupling.
FIG. 5b is a schematic drawing of an overfilled fibre coupling.

FIGS. 5a and 5b are schematic drawings of an underfilled and an overfilled fibre coupling, respectively. Overfilling the fiber coupling allows a better high order mode coupling, maximizing the effect of intermodal dispersion.

Figure 6:
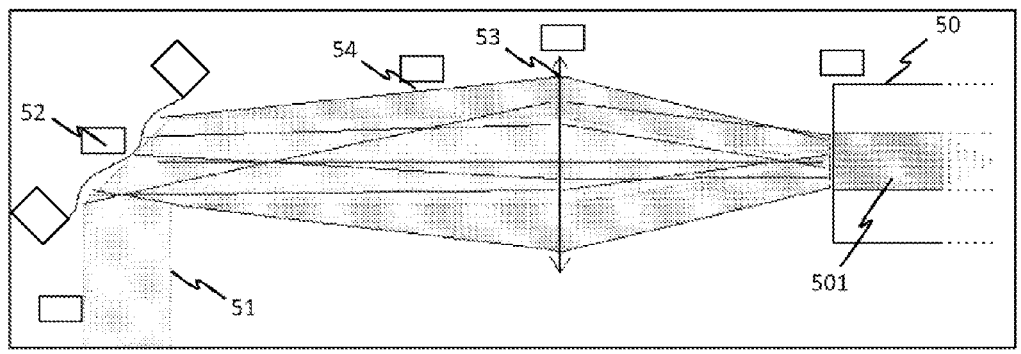
FIG. 6 is a schematic drawing of a collimated light beam reflected from a vibratable membrane mirror and focussed on an end of a multimode optical fibre, in accordance with the invention.

A maximized coherence time reduction effect is achieved when $\Delta\sigma_{eff} \rightarrow \Delta\sigma_{th}$. As shown in FIG. 6, a deformable mirror assists satisfaction of this requirement by averaging power distribution across the propagating modes, without the mode coupling consequences of a mode scrambler.

Best high order mode coupling is achieved when overfilled coupling is achieved as shown in FIG. 5b but care must be taken when doing so as a too generous overfill would have instantaneous consequences in terms of light losses through the fibre.

Light travels coherently within each propagating mode and observing light being scattered from a surface located after going freely out of the fibre output exhibits speckles, despite the action of the vibratable mirror, i.e. with no collection or focussing optics on the fibre output, speckle will be observed, i.e. the projection optics are required.

This phenomenon can be explained by modelling the output of the fibre as the sum of de-correlated quasi-monochromatic sources circularly distributed.

The size of a coherence area $A_c$ on a considered surface (assuming it is located at a distance d) can be proven to be given by $$A_c \propto \frac{\lambda d}{a}$$

where $\lambda$ is the wavelength of the coherent or partially coherent light source and a is the core radius of the optical fibre. This area grows linearly with distance. If measured at a meter for a visible wavelength and a 200 core radius, the coherence area is of the order of millimeters.

Considering an observation system looking at the illuminated area: an emmetrope eye located at one meter (for the sake of simplicity) would have a resolution of circa 300 μm ($A_r$). A C-mount machine vision camera (still located at 1 m) with an f#5 lens would resolve circa 360 μm.

Defining now the (statistical) density of coherence areas per "resolution unit" across the illuminated area:

$$\rho_c = \frac{A_c}{A_r}$$

In both cases $\rho_c \gg 1$ and the observed speckle contrast is K=1. Speckle contrast will be limited at a lower value by the action of any previous coherence reduction process introduced prior to that stage.

When adding a condenser lens of diameter D between the output of the fibre and the scattering surface such that the cone of light emitted from the fibre fills the entire aperture of the condenser lens and the scattering surface is located at a distance z from the condenser, one can show that $$A_c' \propto \frac{\lambda z}{D}$$

and the new density of coherence areas per "resolution unit" becomes:

$$\rho_c' = \frac{A_c'}{A_r}$$

For z=1 m and D=1", $A_c'$ is now of the order of 10-20 μm and $\rho_c' \lesssim 1$ The associated speckle contrast can be proven to be $K \approx \sqrt{\rho_c'}$ Referring to FIG. 6 the vibratable membrane mirror 52, because of a low spatial distance between ripples, typically 1-2 mm, with high amplitude, 10-30 μm, on its surface, continuously reflects the incoming parallel rays at a variety of angles. As a consequence, the distribution of power (amplitude) coupled over the space of propagating modes in the optical fibre and their phase is constantly varying.

Thus a uniformed or apodized collimated beam 54 is reflected from the vibratable mirror 52 at 45 degrees incidence. The rays reflected at a variety of incidences form a diverging beam whose distribution of intensity is time varying. This beam is then coupled by a coupling lens 53 into the core 501 of a multimode step index optical fibre 50.

The sole contributions of the optical fibre and the lens are not sufficient to achieve good speckle reduction unless combined with a high frequency modulation of both the amplitudes and phases of the radiations propagating across the set of guiding modes of the optical fibre, introduced by the vibratable membrane mirror.

To summarise, the vibratable membrane mirror introduces variation in time and space in the angles and power of light impinging on points on the face of the optical fibre after passing through an input coupling lens.

The impact of this variation is that power coupled into modes of the waveguide varies in time and also that there is a wider spread of power in the modes due to the action of the deformable mirror when compared to a rigid mirror or another one of the alternatives of FIGS. 8 to 10.

Following the fibre, light is coupled out of the fibre and projected onto a surface. Spatially there are "coherence areas" associated with the distribution of light on this surface. The observation of speckle is proportional to the density of coherence areas as well as the sampling resolution of the observer. The observation of speckle is also proportional to the temporal coherence of light at this surface. Greater decorrelation of light reduces speckle.

The impact of mirror and fibre is to change relative phases and amplitudes between propagating modes. These can then be seen as decorrelated quasi monochromatic sources assuming average time delays of the order or greater than the coherence time due to intermodal dispersion of the waveguide.

The invention provides a vibratable membrane mirror, a multimode optical fibre and an optical projection system such that the level of decorrelation of temporal coherence is increased significantly. In particular, compared with a rigid mirror and applying the same logic the combination of deformable mirror and optical fibre have a greater "decorrellating" effect on the various modes going out of the fibre than the rigid mirror.

The following table records the speckle contrast and fringe visibility values calculated for the pictures of FIG. 11. Speckle contrast ratio, whose expression is given by $$K = \frac{\sigma_{I(x,y)}}{\langle I(x, y) \rangle},$$

is a "noise" oriented measure the accuracy of which will be dependent on:
 the size of the patch used for calculation;
 on the uniformity of the illuminated patch across which the ratio is measured;
 on the spatial frequency of the speckle; and
 camera noise/background roughness.

Speckle contrast ratio is the most common way to evaluate speckle over a large illuminated area, but measuring speckle contrast ratio at a required accuracy is a very delicate process.

Conversely, fringe visibility is a measure of the contrast between dark and bright speckles.

$$V = \frac{I_{max} - I_{min}}{I_{max} + I_{min}}$$

This measure does not require a large illuminated patch of uniform intensity and is independent of the spatial frequencies of the speckle. Nevertheless, when used for an extended area, accuracy will rapidly decrease with large variations of the background (non-speckle) intensity, roughness and artefacts.

Calculations were made over 10 different subsets of 100×100 pixels each located in manually chosen zones of the pictures ensuring minimum light intensity variations due to the set-up itself rather than to speckle. The measurements are subject to an uncertainty of 5%.

|  |  | Deformable mirror steady | Deformable mirror resonating |
|---|---|---|---|
| FT400EMT 1 meter | Speckle contrast | 0.67 | 0.15 |
|  | Fringe visibility | 0.94 | 0.47 |
| FT400EMT 2 meters | Speckle contrast | 0.57 | 0.08 |
|  | Fringe visibility | 0.91 | 0.28 |
| FT400EMT 5 meters | Speckle contrast | 0.31 | 0.08 |
|  | Fringe visibility | 0.68 | 0.24 |

This table clearly shows a consistent improvement in both speckle contrast and fringe visibility when lengthening the optical fibre and/or addition of a dynamic coupling mirror. The motivation of giving, for each picture, the value of both speckle contrast and fringe visibility is that different applications of the anti-speckle device will have different merit criteria.

Figure 12:
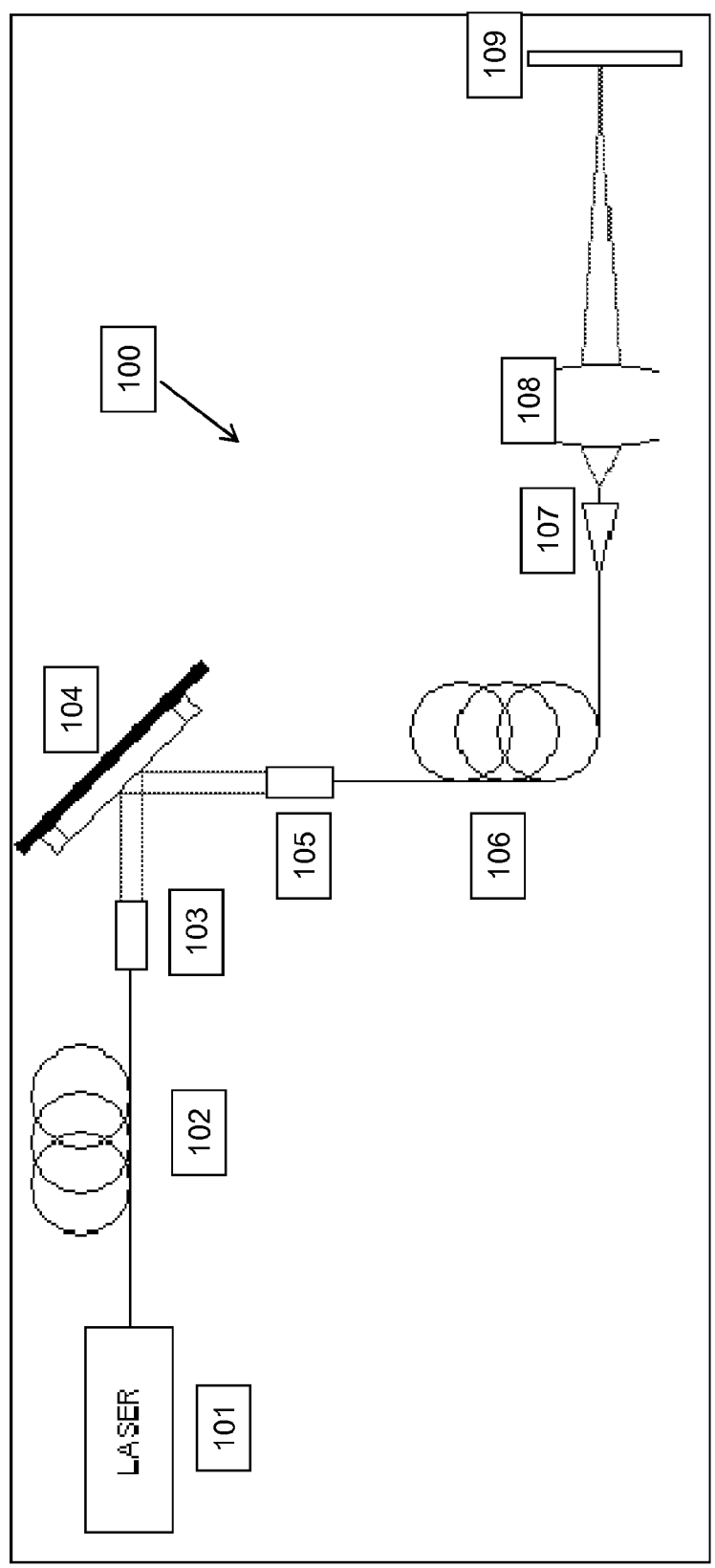
FIG. 12 is a schematic drawing of an optical setup for speckle-free laser line generation in accordance with an aspect of the invention.

Referring to FIG. 12, a laser line generating device 100 according to an aspect of the invention, comprises a 650 nm Roithner laser diode 101 coupled by an optical fibre 102 to a collimating lens 103. Light from the laser 101 emergent from the collimating lens 103 is incident at an angle of approximately 45° on a 25 mm diameter piezoelectric actuated membrane mirror 104. Light reflected from the membrane mirror 104 passes through coupling optics 105 into a 200 μm core multimode optical fibre 106. Light emergent from the 200 μm core optical fibre 106 passes though an SMA connector 107 to projection optics 108 shown in more detail in FIG. 13. The projection optics 108 projects a line onto a CMOS matrix image detector 109 with a pixel size of 7.5 μm.

Figure 13:
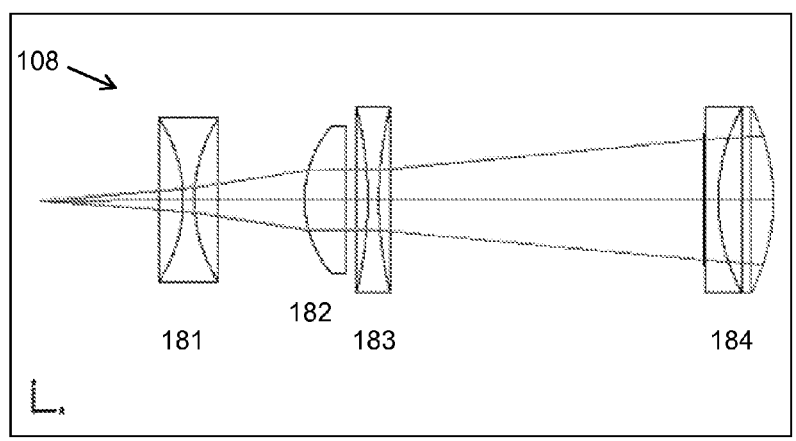
FIG. 13 is a CAD of the line projection optics for the optical setup of claim 12.

Referring to FIG. 13, the projection optics 108 comprises four lenses in series. The four-lens anamorphic objective projects a 100 μm wide line, 30 mm long at a distance of approximately 150 mm. The first lens 181 (f=−20 mm), the third lens 183 (f=−50 mm) and the fourth lens 184 (f=60 mm) are spherical lenses available from Linos. The second lens 182 is a toroidal lens (fy=30 mm) available from Thorlabs.

The laser line generating device produces a line width of 13 pixels, 100 μm wide at FWHM; 17 pixels, 130 μm, wide in total with a line length of approximately 30 mm. The laser line profile is Gaussian in both X and Y directions (as opposed to "top hat", for example).

FIG. 14 shows the recorded distribution of intensity across the projected line. A high contrast "rice grains" distribution of light is clearly visible in FIG. 14a. Such a profile would be likely to lead any line fitting algorithm to introduce large errors in an interpolation. FIG. 14b shows how much clearer the profile becomes when the deformable mirror 104 is vibrating at its resonant frequency.

FIGS. 15a and 15b are superimpositions of a cross-section across two positions respectively of the scanning line of FIGS. 14a and 14b showing a first trace 131 of intensity distribution across the projected line without speckle removal and a second trace 132 of intensity distribution across the projected line without speckle removal. It is readily apparent that the speckle removal provided by the invention provides a much smoother cross-section to the projected line.

It will be understood that the apparatus and method have an advantage over the prior art, which is dependent for its effectiveness on operating an oscillating rigid mirror at over 20 Hz corresponding to the 50 ms integration time of the human eye, in that images may be recorded with the present invention over a much shorter 300 μs exposure time, since the membrane mirror resonates at a much higher frequency than the oscillation time of an oscillating mirror.

In the rigid oscillating mirror, light reflected from the mirror is scanned in a time repeated pattern and in a elliptical orbit at the fibre entrance. The degree of variation in incident angle and consequent mode excitation within the fibre provided by this approach does provide some speckle contrast reduction. However using a deformable mirror as in the present invention, there is greater variety of angles placed on the reflected wave packets by both the faster frequency variation achievable as well as the greater distribution of spatial angles of waves reflected from the mirror.

The result of this increased angular variation at the fibre face is greater distribution of light coupling to the waveguide or fibre modes.

In addition, the invention provides the advantage of an ability to use the technique to generate a low noise line or rastered point to build an image.

Although a preferred embodiment of the invention has been described in which light reflected form a vibratable membrane mirror is subsequently passed through a multimode optical waveguide, it will be understood that a different order of elements of the invention may be employed. For example, the coherent light could first be passed through a multimode optical waveguide and then reflected by a vibratable membrane mirror, possibly with the use of additional diffusers or other light scatterers.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for reducing visibility of speckle in coherent light comprising:
   multimode optical waveguide means arranged to propagate the coherent light therethrough to reduce a coherence length of the coherent light by intermodal dispersion of the coherent light within the multimode optical waveguide; and
   vibratable membrane mirror means arranged to reflect the coherent light either before or after passing through the multimode optical waveguide means,
   wherein a membrane of the vibratable membrane mirror is responsive to an actuator to create ripples within the membrane to further reduce the coherence length by distributing wave packets of the coherent light across different propagating modes and to erase a modal structure of the coherent light by averaging the distribution of energy of the wave packets across the modes leading to a more uniform illumination.

2. An apparatus as claimed in claim 1, wherein the vibratable membrane mirror means is arranged to reflect parallel rays of the coherent light at a plurality of varying angles so that a distribution of power and phase over modes propagating in the optical waveguide means varies with time.

3. An apparatus as claimed in claims 1, wherein a laser is coupled by optical fibre to collimating lens means arranged to cause the coherent light to be incident upon the vibratable membrane mirror means.

4. An apparatus as claimed in claim 3, arranged such that light from the collimating lens means is incident on the vibratable membrane mirror means at substantially 45°.

5. An apparatus as claimed in claim 1 further comprising coupling optics means arranged to couple coherent light reflected from the vibratable membrane mirror means to the multimode optical waveguide means.

6. An apparatus as claimed in claim 1 comprising optics arranged to project light from the multimode optical waveguide means.

7. An apparatus as claimed in claim 1, wherein the vibratable membrane mirror means comprises piezoelectric actuator means arranged to drive the membrane and create the ripples in the membrane.

8. An apparatus as claimed in claim 1, wherein the multimode optical waveguide is a step index, multimode optical fibre.

9. An apparatus as claimed in claim 1 further comprising a laser line generating device.

10. A method of reducing visibility of speckle in coherent light comprising:
    propagating the coherent light through a multimode optical waveguide to reduce a coherence length of the coherent light by intermodal dispersion;
    reflecting the coherent light from a vibratable membrane mirror means either before or after passing through the multimode optical waveguide means; and
    while reflecting the coherent light from the vibratable membrane mirror, actuating a membrane of the vibratable membrane mirror to create ripples therein to further reduce the coherence length of the coherent light by distributing wave packets across different propagating modes and to erase the modal structure by averaging the distribution of energy across the modes leading to a more uniform illumination.

11. A method as claimed in claim 10, wherein reflecting the coherent light comprises reflecting parallel rays of the coherent light at a plurality of varying angles by the actuated membrane of the vibratable membrane mirror means so that a distribution of power and phase over modes propagating in the optical waveguide means varies with time.

12. A method as claimed in claim 9 further comprising using collimating lens means coupled by an optical fibre to a laser to cause the coherent light to be incident upon the vibratable membrane mirror means.

13. A method as claimed in claim 10, wherein light from the collimating lens is incident on the vibratable membrane mirror means at substantially 45°.

14. A method as claimed in claim 10 further comprising coupling the coherent light to the multimode optical waveguide means using coupling optics means.

15. A method as claimed in claim 10 further comprising projecting light from the multimode optical waveguide means using projection optics means.

16. A method as claimed in claim 10 further comprising driving the membrane of the vibratable membrane mirror means with piezoelectric actuator means.

17. A method as claimed in claim 10 wherein the multimode optical waveguide means is a step index, multimode optical fibre.

* * * * *